(12) United States Patent
Jwalanna

(10) Patent No.: US 9,614,933 B2
(45) Date of Patent: Apr. 4, 2017

(54) METHOD AND SYSTEM OF CLOUD-COMPUTING BASED CONTENT MANAGEMENT AND COLLABORATION PLATFORM WITH CONTENT BLOCKS

(71) Applicant: Anil Jwalanna, Cupertino, CA (US)

(72) Inventor: Anil Jwalanna, Cupertino, CA (US)

( * ) Notice: Subject to any disclaimer, the term of this patent is extended or adjusted under 35 U.S.C. 154(b) by 968 days.

(21) Appl. No.: 13/915,327

(22) Filed: Jun. 11, 2013

(65) Prior Publication Data
US 2014/0365555 A1    Dec. 11, 2014

(51) Int. Cl.
*H04L 29/06* (2006.01)
*G06Q 10/00* (2012.01)
*G06F 17/30* (2006.01)

(52) U.S. Cl.
CPC ........ *H04L 67/42* (2013.01); *G06F 17/30165* (2013.01); *G06Q 10/00* (2013.01)

(58) Field of Classification Search
CPC ..................................................... H04L 67/42
USPC ........ 709/206, 221, 246, 248; 707/612, 617, 707/618
See application file for complete search history.

(56) References Cited

U.S. PATENT DOCUMENTS

| | | | | |
|---|---|---|---|---|
| 7,076,728 | B2 * | 7/2006 | Davis | G06F 17/243 709/220 |
| 2004/0177120 | A1 * | 9/2004 | Kirsch | H04L 12/585 709/206 |
| 2008/0140786 | A1 * | 6/2008 | Tran | G06Q 10/10 709/206 |
| 2008/0244009 | A1 * | 10/2008 | Rand | G06Q 10/107 709/206 |
| 2012/0117168 | A1 * | 5/2012 | Sugiyama | G06F 9/5055 709/206 |

OTHER PUBLICATIONS

"Collection Synchronization for Web Distributed Authoring and Versioning (WebDAV)"—Daboo et al, IETF, Mar. 2012 https://greenbytes.de/tech/webdav/rfc6578.pdf.*

* cited by examiner

*Primary Examiner* — Randy Scott

(57) ABSTRACT

In one exemplary embodiment, a computer-implemented method of cloud-computing based content management includes receiving a dynamic content block generated by a first user of a first client application in a first user's computing device. The dynamic content block is stored in a cloud-storage environment. A search query for the dynamic content block by a second client application in a second client's computing device is received. The dynamic content block is provided to the second client application. An update to the dynamic content block by the first user is received. The update to the dynamic content block is automatically synchronizing to the second client application. Optionally, the dynamic content block can be a wit. The dynamic content block can include a reusable portion of user-generated information such as a portion of a sales document or repeatedly used email content. A drag and drop operation from the second client application to another application can be detected.

15 Claims, 18 Drawing Sheets

| WITS | TEMPLATES | NAME | EMAIL | ROLE | FIELD NAME |
|---|---|---|---|---|---|
| CONTACTS<br><br>TEMPLATES<br>  TEMPLATE1<br>  TEMPLATE2<br><br>FOLDERS<br>  FOLDER1<br>  FOLDER2 | | ANIL, ADVANI<br><br>DOUG SMITH<br><br>MIKE LU<br><br>o<br>o<br>o | A@VANI.COM<br><br>D@SELL.COM<br><br><br><br>o<br>o<br>o | ATTORNEY<br><br>IT SPECIALIST<br><br>SALES<br><br>o<br>o<br>o | <br><br>SOFTSALE<br><br>ACME TECH<br><br>o<br>o<br>o |

SELECTION WINDOW 302

USER GROUPINGS WINDOWS 314

FIGURE 3B

METHOD AND SYSTEM OF CLOUD-COMPUTING BASED CONTENT MANAGEMENT AND COLLABORATION PLATFORM WITH CONTENT BLOCKS

CROSS-REFERENCE TO RELATED APPLICATIONS

This application claims priority to U.S. patent provisional application No. 61/663,169 titled CLOUD BASED CONTENT MANAGEMENT filed on Jun. 22, 2012. This application claims priority to U.S. patent provisional application No. 61/773,083 titled CLOUD BASED CONTENT MANAGEMENT filed on Mar. 5, 2013. These provisional applications are hereby incorporated by reference in their entirety.

BACKGROUND

1. Field

This application relates generally to cloud computing, and more specifically to cloud-computing based content management and collaboration platform with dynamic content blocks.

2. Related Art

When large amount of contents/data are to be managed, whether in an organization or personal systems, content management becomes a tough task without help of a proper content management tool. The contents can be emails, proposals, white papers, case studies and so on. For example, e-mail is one of the most widely used communication modes, for personal as well as business communications. In the example case of business communication, each person, whether employee, employer or clients can have to deal with plenty of emails each day.

In most of the cases, it can be possible that a person has to deal with similar emails at multiple instances of time. For example, consider a customer care executive who is interacting with multiple clients of an organization. For instance, the customer care executive can be receiving similar queries from multiple clients and can have to provide similar answers to those queries. From an organizational perspective, it would be important to maintain consistency in replies to mails of the same kind. At present, the only way is to manually search for the previous mail conversation and copying and pasting the contents to the new mail reply. This process of manually searching for a mail from a list of large number of mails would be time consuming as well as hectic job.

Further, from the time perspective, it is important for any business organization that they reply to the customer/client queries in shortest span of time. When previous mail contents have to be manually searched, it causes lot of time delay. Delay in reply can even adversely affect the business. If the proper content can be retrieved from the database on time, it is easy to finish the task in set time period.

BRIEF SUMMARY OF THE INVENTION

In one aspect, a computer-implemented method of cloud-computing based content management includes receiving a dynamic content block generated by a first user of a first client application in a first user's computing device. The dynamic content block is stored in a cloud-storage environment. A search query for the dynamic content block by a second client application in a second client's computing device is received. The dynamic content block is provided to the second client application. An update to the dynamic content block by the first user is received. The update to the dynamic content block is automatically synchronizing to the second client application.

Optionally, the dynamic content block can be a wit. The dynamic content block can include a reusable portion of user-generated information such as a portion of a sales document or repeatedly used email content. A drag and drop operation from the second client application to another application can be detected. The other application can be a client application of a third-party server process such as an email application in a user-side device. The third-party server process can be communicatively linked with the cloud-storage environment. The dynamic content block can be communicated from the cloud-storage environment to the third-party server process.

In another aspect, a method includes receiving a request for a reusable content block, from a client-side computing device. The reusable content block includes a textual content and an associated document. One or more portions of the reusable content block are fetched from one or more data repositories. The method includes federating the one or more portions of the reusable content block. A federated version of the reusable content block is provided to the client-side computing device or a third-party server.

BRIEF DESCRIPTION OF THE DRAWINGS

The present application can be best understood by reference to the following description taken in conjunction with the accompanying figures, in which like parts can be referred to by like numerals.

FIG. 3A-B provide block diagrams illustrating an example process of grouping wits and users for secured access, according to some embodiments.

Figure 1A:
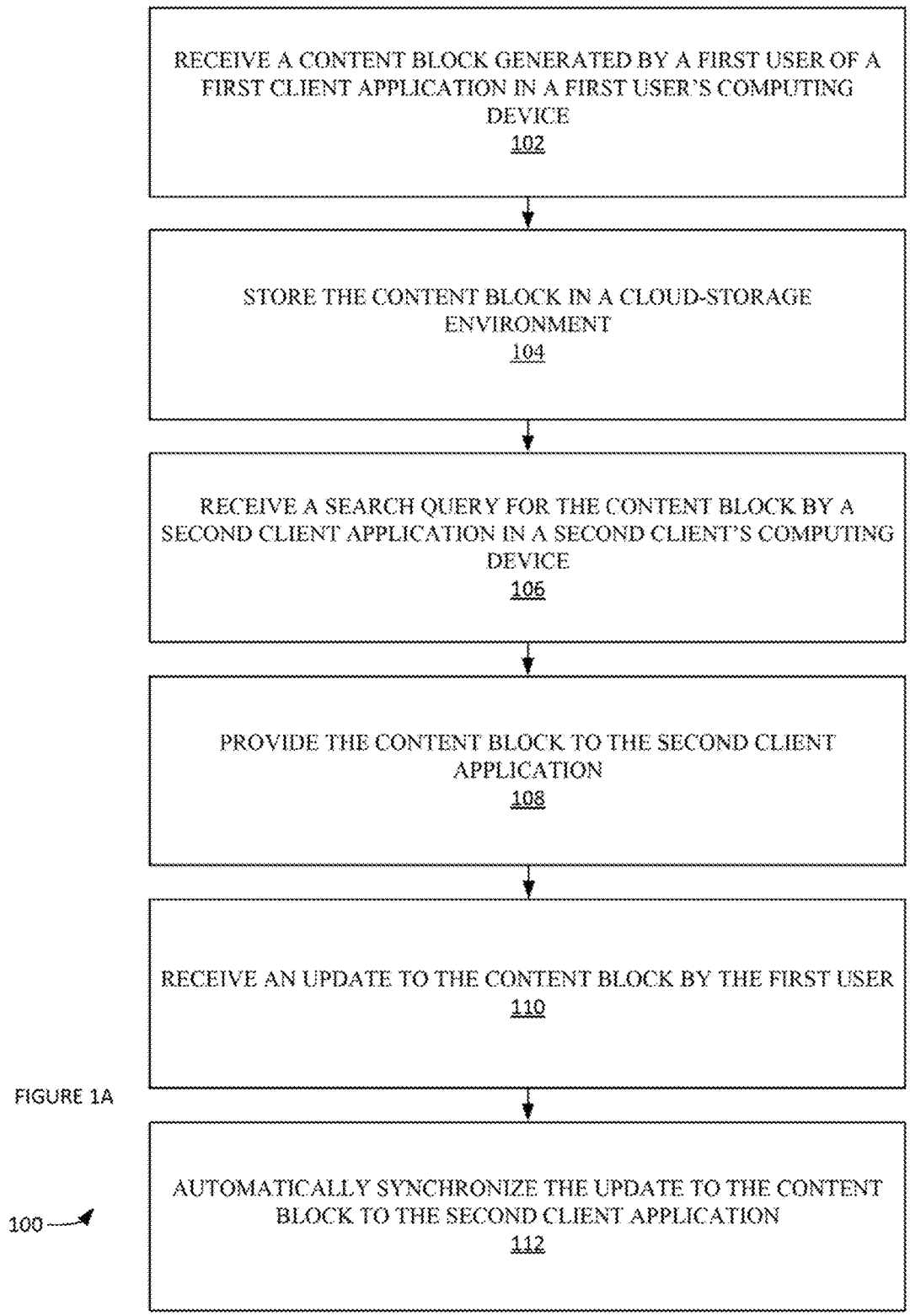
FIGS. 1A-B depict a computer-implemented method of cloud-computing based content management, according to some embodiments.

The Figures described above are a representative set, and are not an exhaustive with respect to embodying the invention.

DETAILED DESCRIPTION

Disclosed are a system, method, and article of manufacture for cloud-based content management and collaboration platform with dynamic content blocks. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein can be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification can, but do not necessarily, all refer to the same embodiment.

Furthermore, the described features, structures, or characteristics of the invention can be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention can be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagrams, and they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or can not strictly adhere to the order of the corresponding steps shown.

Exemplary Process

Figure 1B:
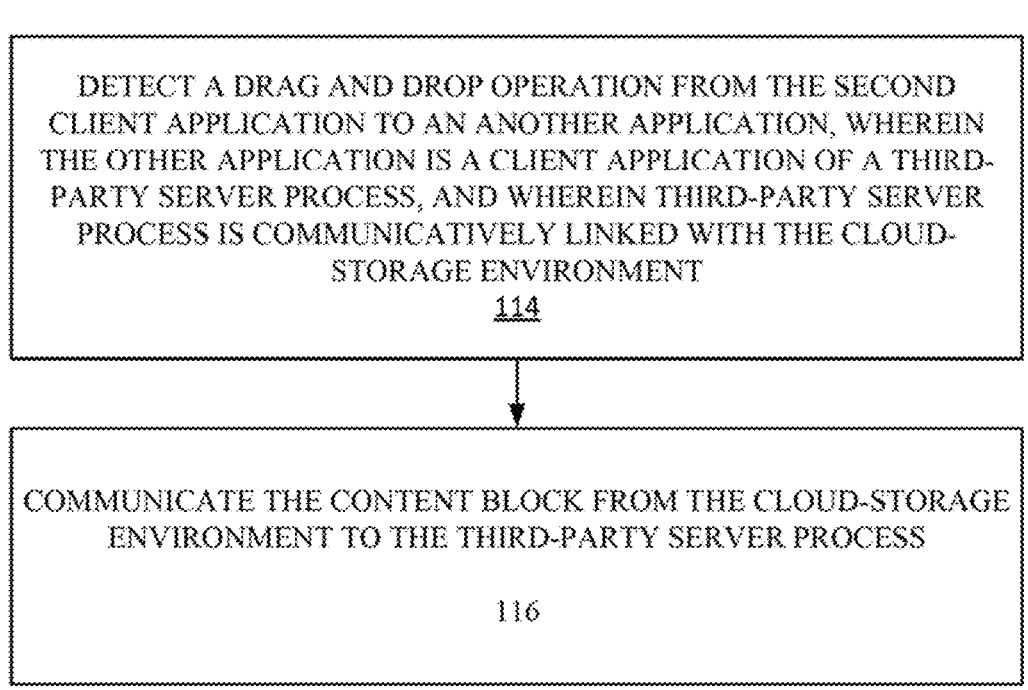

FIGS. 1A-B depict a computer-implemented method 100 of cloud-computing based content management, according to some embodiments. In step 102 of process 100, a dynamic content block (e.g. a 'wit'—see infra) (the terms 'dynamic content block' and 'wit' can be used interchangeably herein) generated by a first user of a first client application in a first user's computing device is received. The dynamic content block of information can be a reusable portion of user-generated information. The dynamic content block can include both text and dynamic text. Dynamic text can include a reference to another source of information (e.g. with a uniform resource locator (URL), with an address to another word document, references to external programs and/or repositories, and the like). The dynamic text can be a document. In some examples, the dynamic content block can be a combination of textual content and associated documents attached together. Generic name for dynamic content block could be "Reusable Content Block". Wit contains the 'Textual Content' may have rich text, images, video objects, web links, etc. A dynamic content block can also include other dynamic content (e.g. a power point presentation, rich media, etc.). Dynamic text and/or dynamic content can be fetched and federated 'on the fly' from external programs and/or repositories. In this way, a dynamic content block can include rich text, images, video objects, web links, etc.

The reference can be visible in the dynamic context block and/or stored as metadata associated with the dynamic content block. Dynamic text can be signified with a specific sing (e.g. an '&'). For example, the dynamic content block comprises a portion of a digital sales document, an email, a training manual, a legal document and the like. In one example, the user can use a wit application (e.g. a wit can be a reusable content block) to generate a dynamic content block of information. In step 104, the dynamic content block can be stored in a cloud-storage environment. In step 106, a search query for the dynamic content block generated by a second client application in a second client's computing device can be received. For example, a management application of the cloud-storage environment can include a search engine functionality that receives queries for content blocks and provides a list of match results. The management application can operate in cloud-based wit server(s) 402 as provided in FIG. 4 and/or wit server 902 as provided in FIG. 9. Additionally, the cloud-storage environment can be implemented in wit repositories 408.

In step 108, the dynamic content block can be provided to the second client application. In step 110, an update to the dynamic content block by the first user (e.g. as modified with the first application) can be received by the management application of the cloud-storage environment. In step 112, the update to the dynamic content block can be automatically synchronized to the second client application (e.g. by the management application). Additional examples of steps 102-112 of process 100 are described in further detail in FIGS. 2-9 and their concomitant descriptions.

FIG. 1B depicts additional optional steps of process 100, according to some embodiments. In step 114, a drag and drop operation from the second client application to another application (e.g. an email application) can be detected. The other application is a client application of a third-party server process. For example, the wit client application in the user device can detect the drag and drop operation, identify the content to be dragged and communicate this information to a wit server (e.g. wit server 402 and/or wit server 902). The third-party server process can be communicatively linked with the cloud-storage environment. In step 116, the dynamic content block from the cloud-storage environment can be communicated to the third-party server process. In some examples, process 100 can include additional steps. For example, a portion of the dynamic content block can be fetched from the one or more content sources referred to in the dynamic content block. This can be done when the dynamic content block is drag and dropped into a client-side application. The portion of the dynamic content block received from the one or more content sources can be integrated into the dynamic content block.

Figure 2:
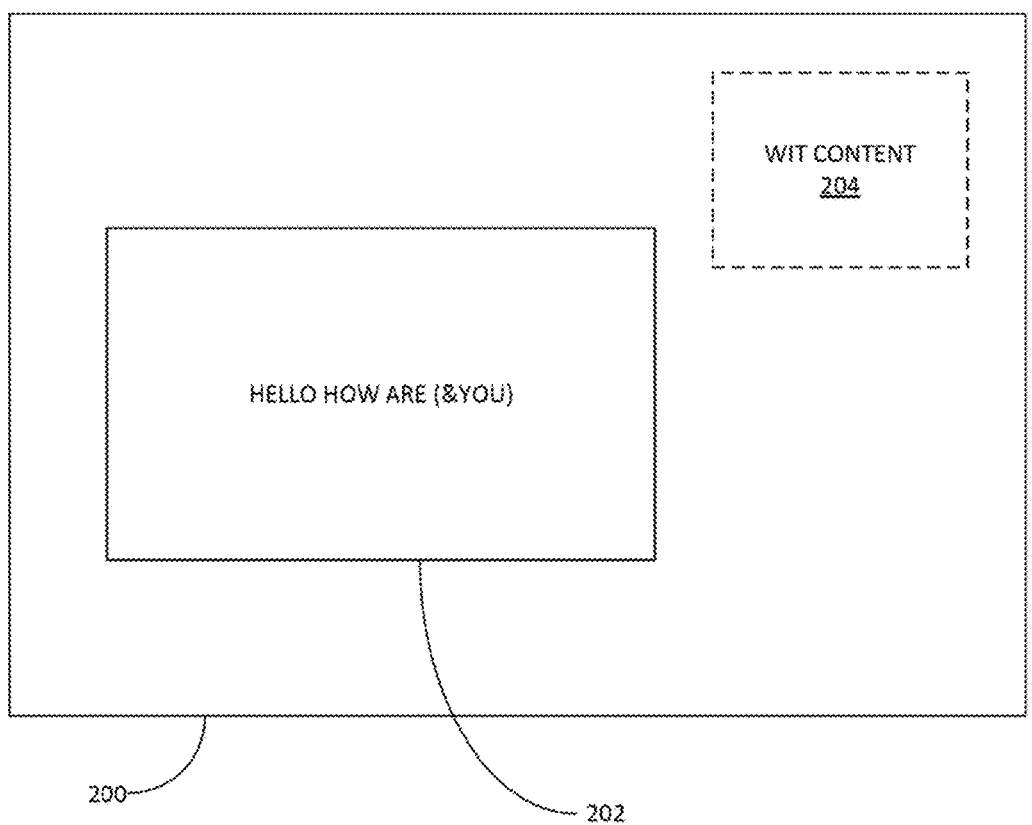
FIG. 2 is a block diagram that illustrates process of creating a wit, according to various embodiments.

FIG. 2 is a block diagram that illustrates process of creating a wit, according to various embodiments. Wits can be implemented with any text writing applications such as word-processing application (e.g. to generate a report, a white paper, etc.), email application, a blogging/microblogging, application, and so on. In one example, the wit can be an acronym wit that comprises information only in the form of text or can be a tag wit that includes attachments in addition to information in the form of text. The text in a wit can be any information such as address, disclaimer, notes, as well as, any such information which can be used regularly while creating write-ups such as reports, entails and so on. In a stored form a wit can also include metadata (e.g. a pointer to a digital document, web page, etc.) that provides various instructions to a wit server (e.g. wit server(s) 402) such directions to obtain and insert additional information from a specified location. Further, the text information can be stored in a wit in any suitable format such as RTF (Rich Text Format), a word document format, etc. In various embodiments, the user can convert a content of an email into a wit and/or content content from any desktop application into a wit. Various user input modalities can be utilized to utilized and/or create wits. For example, a user can drag and drop, cut and paste, convert speech to text and/or manually key in text so as to create a wit. The wit can be saved in a database/repository associated with a wit server (e.g. wit repository 408 associated with wit server 402 provided infra).

Drawing template 200 can be platform agnostic. For example, drawing template 200 can be implemented with any document format such as an email application, a word processing application, etc. For example, consider that certain information is stored in the form of wit content 204 in a wit server. In some embodiments, drawing template can be implemented by wit clients 406A-N described infra. Further, wit content 204 can be associated with certain address/index such that the wit can be retrieved from wit repository 408 by entering the address/index in a dedicated search field. The address/index can be a number, name or a combination of both that is associated with at least one wit. In this example, wit content 204 can be saved under the address "you". The ampersand symbol '&' can be a trigger to obtain wit content 204 and insert the address wit content 204 into document 202. Wit content 204 can be reusable and available when the same wit content 204 can be desired for insertion into another document. Wit content 204 can be retrieved and used again with the use of the same trigger/address combination. In other example, to use a selected wit, the user can also drag and drop the wit to the email client and/or desktop application. In various other embodiments, the user can use a combination of address and/or a keyboard shortcut (e.g. a 'hot key') a wit in order to insert/input wit content into document 202.

A wit can fetch substantially current content and documents from any associated external source (such a constituent federated database) as well. For example, a wit can include hyperlinks to external third-party content. Upon insertion of a wit into a document, the wit server can be obtain the linked-to information (e.g. a specified portion of a third-party white paper in a digital format, etc.) and update the wit content accordingly before providing the wit to wit clients 406A-N. Wits can be organized into folders and/or sub folders. Further, wits can be marked as favorites and ranked according to provide quicker access to a user. Further, secures access mechanisms can be used to ensure security of data stored in wits in the wit server.

Figure 3A:
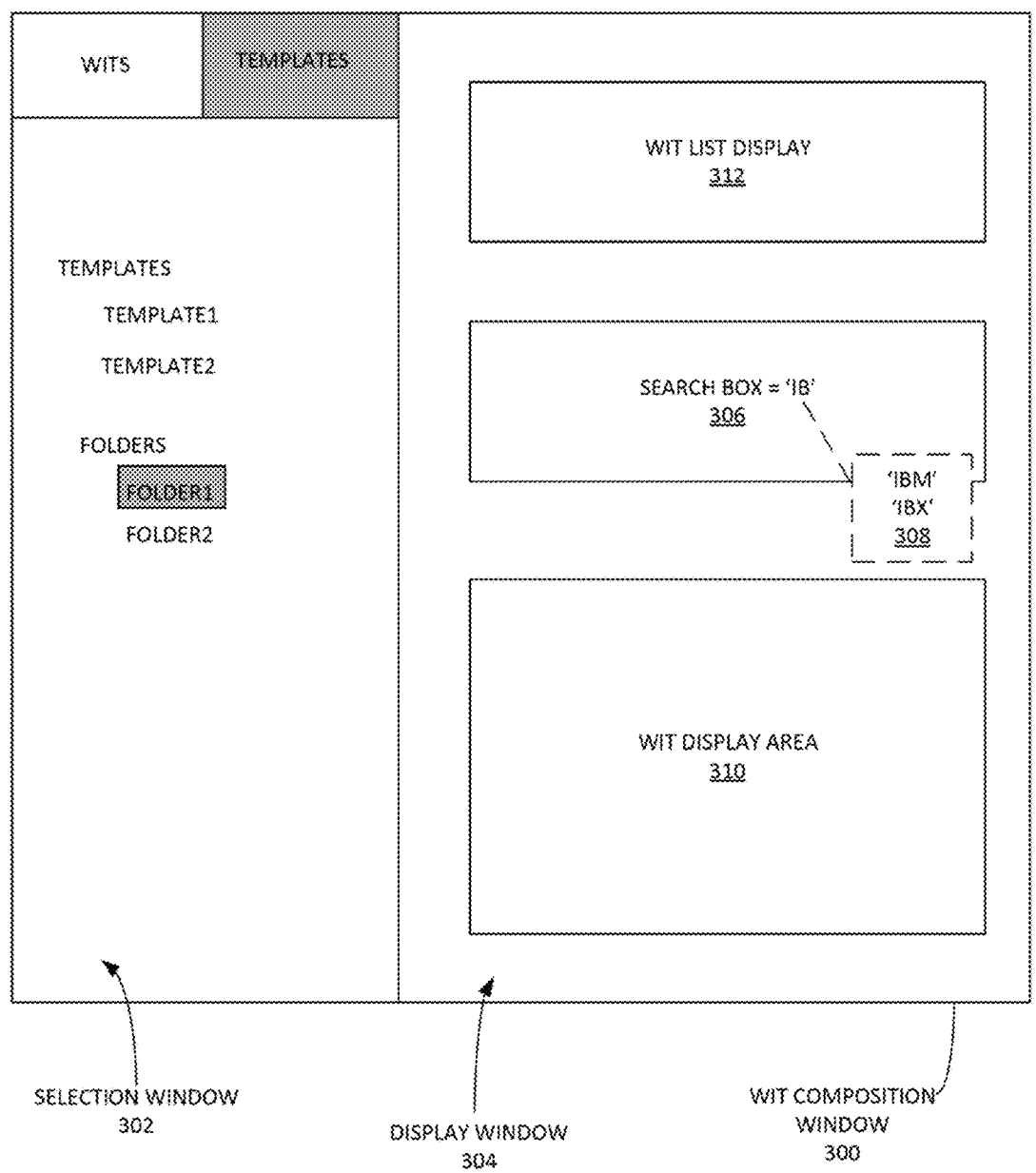

FIG. 3A-B illustrate an example process of grouping wits with users, according to some embodiments. In one example, a wit composition window 300 can be displayed to a user. Wit composition window can include various other sub-windows such as selection window 302 and/or display window 304.

When a new wit is created, a certain address/index can be associated with the wit. The wit can be grouped and stored in a specified folder(s) such as those linked to in selection window 302. Certain folders can be listed as sub folders listed under other folders. The listing of wits under folders and/or subfolders can be based on any criteria such as wits that are to be provided, to/shared with various user groups (e.g. an entity identifier) and so on. When a folder is selection (e.g. such as folder 1 as shown in FIG. 1), wits associated with the folder can be listed in wit list display 312.

The folders can be selected from the selection window 302 and the wits present in the selected folder can be displayed under the display window 304. For example, when a specific wit and/or wit folder is to be retrieved from the repository (e.g. wit repository 408), the user can type the associated address/index in search box 306. An autocomplete feature of various possible matching wits 308 can be superimposed over display window 304. The order in which the system can list matches to the search query can be determined according to various parameters such as relevance to the text entered by the user, number of times each wit has been previously accessed and so on. In various embodiments, contents of each wit can be displayed automatically or when the user manually selects the wit. A selected wit can be displayed in wit display area 310 of wit display window 304.

Similarly, users/customers who are registered to the wit application can also be classified under various groups (e.g. as shown in FIG. 3B). In an embodiment, the users can be classified under various groups based on the personal as well as professional information. Optionally, an administrator and other authorized user can categorize the users present in his/her contact list based on various personal and professional preferences.

The process of grouping wits and users can help to facilitate secured access to the information stored in the wits. An access control mechanism can be implemented such that users under only selected user groups have access to wits stored under selected folders. In a preferred embodiment, access mechanism can be provided in folder level (e.g. users under a certain group can be provided access to wits/information that can be stored in specific folders). In another embodiment, the access mechanism can work in wit level (e.g. users in a specific group can have access to selected wits).

For example, assume that an organization is maintaining information in the form of wits. Some information can be non-sensitive and can be readily made available to the public. Some other information can be sensitive and can be provided only secured access. The wits that contain non sensitive information can be grouped under public folder and can be readily available to all registered users of the system. The system can group sensitive information under specific folders and can provide secured access to these folders. Further, secured access can be provided to these folder contents such that users who are listed under specific groups only, have access to information stored in these folders.

In another embodiment, the system can implement "on demand access" to certain wits/folders such that any interested person/customer can request for access to those wits/information and the system (e.g. an authorized person such as administrator can decide whether access is to be provided or not). In another embodiment, certain wits/wits stored in certain folders can be kept as personal information such that only the person created can have access to that information.

In another embodiment, in order to provide better security to the data based on relevance and importance, an admin or any such authorized person can be able to set access permissions to any folder as a whole or to individual wits. For example, an administrator can set "read only" permission to certain wits such that other users cannot make modifications to the wit's content.

Exemplary Environment and Architecture

Figure 4:
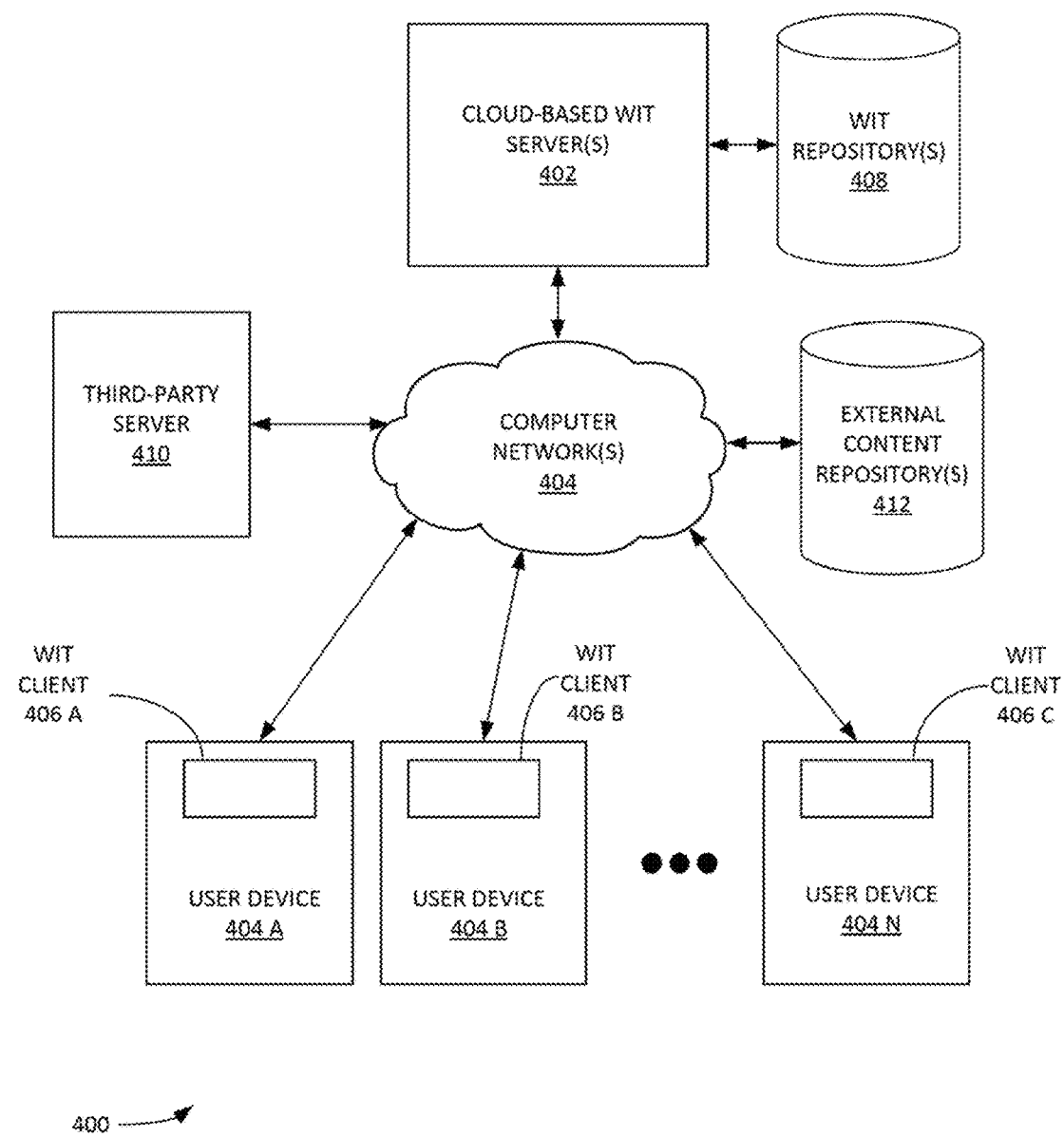
FIG. 4 illustrates block diagram with a plurality of user devices accessing wit server, according to some embodiments.

FIG. 4 illustrates block diagram wit a plurality of user devices accessing wit server, according to some embodiments. The plurality of user devices 404A-N can be any compatible devices such as mobile phone, laptop, desktop, tablet computers and so on being used by the users/customers. Further, cloud-based wit server 402 can be located on a cloud or in any such location on the network. The user devices 404A-N can have to be internet enabled devices so as to connect to wit server 402. User devices 404A-N can be able to access services offered by wit server 402 using a native application being hosted on the user devices 404A-N. The application can be in the form of a desktop application, side bar, widget, plugin and so on. The plugin can be in a browser, email client and so on. In an embodiment, the application/tool can be based on a browser based technology. Initially the user can have to register to the wit application platform (e.g. wit server 402 by means of a sign up process). The user can be prompted to provide certain personal and professional information during the sign up process. The user/customer can use the application to create session of information (a 'wit') and can store the created wits in wit server 402. The wit can comprise any information such as address, disclaimer, notes and any such information which can be used regularly while creating write-ups such as reports, emails and so on. In an embodiment, the user can choose a new wit option from the wit application and can write the contents manually. In another embodiment, the user can select a portion of write up and can save the selected portion as a wit.

Further, in some examples, wits can be classified into two types based on type of data/information being stored in the wits. In an embodiment, wit that comprises information only in the form of text can be termed as acronym wit. Further, certain address or index can be associated with each acronym wit so as to improve accessibility of the wit. In an embodiment, while composing any write up, the user can search for corresponding acronym wit by entering corresponding address/index in a search field in the wit application/widget. The application/widget can display search result, which can be dragged and dropped onto the write up by the user. In one embodiment, the user can enter use a particular acronym wit by typing corresponding address/index and by pressing a hotkey that is pre-configured. Upon pressing the hot key, information in the corresponding text can replace the typed address/index in the write up.

In another embodiment, a wit that comprises attachments such as mails, media files and so on in addition to text can be termed as a tag wit. Further, certain address/index can be associated with each tag wit. The user can be able to search for a particular tag wit by performing a search in a search field provided with corresponding address/index. The search can provide at least one search result. Further, the user can drag and drop the intended tag wit from the results displayed, to the write up.

The mechanism can provide a group/folder based secured access mechanism to prevent unauthorized access to the information stored as wits. In this system, each user registered with the service can be categorized under certain groups. Further, wits also can be grouped and can be kept in specific folders. Access mechanism can be provided in folder level (e.g. users under a certain group can be provided access to wits/information that is stored in specific folders. Alternatively, the access mechanism can work in wit level (e.g. users in a specific group can have access to selected wits). In various other embodiments, some wits can be set publicly available and some can be set to have restricted access.

For example, consider a case in which a user, who has already registered to the wit application service, is writing a mail using any email client. If the user has to insert a specific address to the mail, which he has stored as an acronym wit in wit server 402, he can search for that acronym wit using the corresponding address/index. Further, he can simply drag and drop the wit to the mail. Here since the user does not have to type the address each time, time consumption and effort can be reduced.

In an embodiment, the system can be able to semantically analyze the email content and suggest suitable wits to the user. The user can have to verify and accept the suggested wits, which can be then automatically added to the mail. In another embodiment, if both users (e.g. the mailing party as well as the mailed party are using wit server application for exchange of mails, then instead of replacing the address with the corresponding text, the mail can be sent with reference to selected wits. The reference can refer to index/address of the wits being used in the mail. Further, when the receiving user opens the mail, the corresponding text can get dynamically rendered automatically by wit server 402. This can help to reduce mail size which in turn can help to reduce bandwidth requirement in the network.

In an embodiment, the proposed mechanism can provide a proxy concept so as to update data in similar wits in a single click. In certain situations, it can happen that at least one wit is stored inside another wit. For example, an address that is stored as a separate wit can have been used inside many other wits. When the address is to be modified or updated, by virtue of the proxy concept, a single wit can be updated and that change can reflect in all similar wits. In an embodiment, the proxy concept can be implemented by creating links between similar wits using any suitable mechanism. In another embodiment, the wits can be linked with any database such that if wit in that database is edited, that change reflects in all linked wits. In another embodiment, the wits can be linked with corresponding databases by associating URLs of corresponding database(s) with the wits using suitable mechanism.

In another embodiment, the application or plugin being installed to the user devices 404A-N can facilitate working in offline mode. This can be implemented using a local cache memory to which the wits can be temporarily stored. Further, the wits in the local cache can be used to create documents or mails when the user is working offline. In an embodiment, the user/customer can be provided with options/settings to select and set various parameters such as cache size and so on. In another embodiment, the user can be able to select and switch between manual and automatic mode using corresponding settings. In the manual mode, the user can have to manually check for cache memory requirements and associated parameters and select and set the desired settings. In automatic mode, the system can automatically detect any system requirements. Further, the system can either suggest the corresponding changes to the user or can automatically adjust the system parameters. In another embodiment, wit server 402 can automate processes of analyzing questions in a Request for Proposal (RFP) document and providing a proposal document with corresponding answers to a client, in a business process. In the business process, a client/company that is looking to purchase goods sends out an RFP document. The RFP document can comprise certain questions that the vendors have to answer while responding to the RFP.

Further, vendors who are interested in a business deal can send a proposal document to the client. The proposal document can comprise answers to all questions being asked in the RFP document, along with any other required information. Further the client can review the proposals received from various vendors and based on the information provided in the proposal document, they can select vendors. Further, the client can send Request for Quote (RFQ) to selected vendors. Then the vendor can review the RFQ and send out quotations to the client.

In a one embodiment, a vendor can be able to use wit server 402 to analyze questions present in a received RFP and provide proposal document with corresponding answers. In order to provide this service, wit server 402 can have to be populated with questions and corresponding answers. Initially, a user/vendor can send a bunch of questions (e.g. questions present in the received RFP, in a suitable format to wit server 402. For example, all questions can be present in a questionnaire document. Further, wit server 402 creates a master wit using the received questionnaire and then, deconstructs the questions present in the questionnaire to individual wits. Wit server 402 can semantically analyze received questions while deconstructing the questions to individual wits. Further, the wits can be routed to experts through a wit application present on user devices such as desktop, mobile phone and so on. Further, the experts in response to the received wits send inner approval work flow corresponding to each wit. The experts can also answer to the questions addresses by each wit.

Further, using the responses received from the experts, the master wit is populated, which is then routed for final approval. Once the master wit get approval, wit server 402 can output a final document that comprises original questionnaire with answers.

Further, the final output document with questions and answers can be sent to the client along with any other data in the proposal document. In an embodiment, the question wits and corresponding answers can be stored in a repository for any future reference. In various embodiments, wit repository 408 in which the question wits and answers are stored can be internal or external to wit server 402.

In an embodiment, upon receiving another questionnaire, the wit server 402 can be able to semantically analyze and identify questions. Further, wit server 402 can compare the identified questions with the questions stored in wit repository 408 and check if any of the received questions has already been answered. If a similar question is found in wit repository 408, wit server 402 can retrieve corresponding answer. The question wits not found in wit repository 408 can be routed to experts and can be stored in wit repository 408 upon receiving answer and approval from the experts.

User devices 404A-N can include any computing system that can be used by a user to compose an electronic message and/or document (e.g. email, word processing document, etc.) that can include a wit as a portion of its content. Exemplary user devices 404A-N can include mobile devices (e.g. smart phones, tablet computers, and the like), laptop computers and desktop computers. Wit clients 406A-N can be implemented in user devices 404A-N. Wit clients A-N can maintain a substantially updated version of a set of wits accessible by the particular clients. The set of wits can be set by a system administrator, algorithmically determined according user identity and profile, based on user wit-use history, etc.

It is noted that wit repository 408 can include federated database system. Accordingly, wit repository 408 can include meta-database management system (DBMS), which transparently maps multiple autonomous database systems into a federated database. Wit repository 408 can provide a uniform user interface for client queries (e.g. from wit server 402 and/or wit clients 406A-N). Thus, wit repository clients can store and retrieve data from multiple noncontiguous databases with a single query. Wit repository 408 can then retrieve the wit content constituent federated databases referred to by pointers in the stored wit. A constituent database can be maintained by a third party. In this way, the third party can maintain the data in a substantially up-to-date state and a queried wit content can then include this substantially up-to-date information when provided to a database client such as wit clients 406A-N. To this end, wit repository 408 can decompose a received query into subqueries for submission to the relevant constituent federated DBMS's, after which wit repository 408 can composite the result sets of the subqueries. In one example, a pointer in a stored wit can include a uniform resource locator (URL) to a third-party content source. It is noted that a pointer can point to another wit (e.g. a wit maintained by another entity).

Wit server 402 can implement content synchronization with external content servers such as third-party server 410. Content (e.g. dynamic content blocks) associated with a user and/or enterprise can be automatically synchronized from third-party server 410 repository such as external content repository 412 to wit server 402 without involving the user's particular client computing device. For example, a first user may want to send content and documents stored in emails to a second user. When the first user implements a content transfer function of a client application, a client-side dynamic content block sharing application can automatically determines the content on the third-party server 410 where the content and documents are available. This content (and any related documents) can then be transferred either directly or via wit server 402 to the recipient second user without involving the user's particular client computing device.

Wit server 402 can implement can include various artificial intelligence algorithms that can locate answers to user-generated queries. Answers can include information from a data repository (e.g. wit repository 40 and/or external content repository 412). For example, a user can pose natural language questions to the application as provided herein in various examples). Wit server 402 can include an application that performs various text analytics and interprets the context of the natural language question. Wit server 402 can locate the matching answer (e.g. can include a search engine functionality) from the applicable data repository of content and documents based on its semantic understanding. These answers are collected and/or refined by various machine-learning algorithms (e.g. with a support vector machine and the like). Thus, the machine-learning functionalities of wit server 402 can continuously learn the context and semantics used by particular users. These algorithms can be written based on NLP (natural learning programs), machine learning languages, artificial intelligence and data mining programs.

Wit server 402 can encrypt wits. For example, all the portions of a wit (e.g. textual content, documents, etc.) can be encrypted at the time of content creation in a client-side computing device. The encryption process and methodology ensure unbreakable or hacking of the Content. Encryption can be performed three phases and multiple times (e.g. three to five times). Encryption steps can include scrambling wit content (e.g. creating salted content). The scrambled content can encrypted using the public and private keys. Subsequently the encryption keys can be further encrypted at the client-side computing device. The encrypted content can be broken into multiple 'chunks' at the client-side computing device and communicated over Internet to multiple-geographically distributed servers. The encrypted content and keys can be further encrypted using server-generated unique string of numbers prior to storing in the servers. Similarly the wit content and keys can be further encrypted multiple times and/or broken into multiple 'chunks' (e.g. discreet portions) of data. The broken 'chunks' of data can be stored on geographically distributed servers and/or data storage devices.

Wit server 402 can include an application that includes one or more artificial intelligent programs that can automatically generate wits from the any documents such as emails, word, power point files, portable document format (PDF) files, and the like. A user can input emails and/or any documents to the application to automatically generate a wit. The artificial intelligent programs can use the input content provided by the users to intelligently capture the repeated content. The repeated content can be formed into reusable content blocks (e.g. wits) for future use. The artificial intelligent programs can learn to generate and prompt users to create a new wit based on the individual and group of user's behavior.

Figure 5:
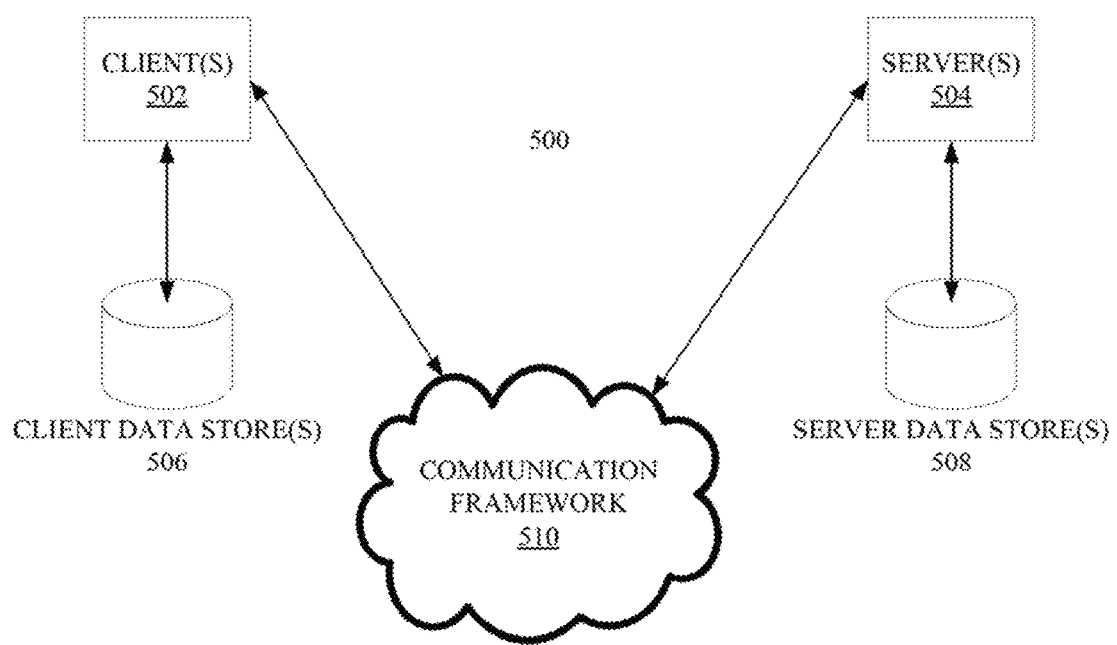
FIG. 5 is a block diagram of a sample computing environment that can be utilized to implement some embodiments.

FIG. 5 is a block diagram of a sample computing environment 500 that can be utilized to implement some embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 can be in the form of a data packet adapted to be transmitted between two or more computer processes. The system 500 includes a communication framework 510 that can be employed to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 508 that can be employed to store information local to the server(s) 504.

In some embodiments, system 500 can be include and/or be utilized by the various systems and/or methods described herein to implement process 100. User login verification can be performed by server 504. Client 502 can be in an application (such as a web browser, augmented reality application, text messaging application, email application, instant messaging application, etc.) operating on a computer such as a personal computer, laptop computer, mobile device (e.g. a smart phone) and/or a tablet computer. In some embodiments, computing environment 500 can be implemented with the server(s) 504 and/or data store(s) 508 implemented in a cloud computing environment.

Figure 6:
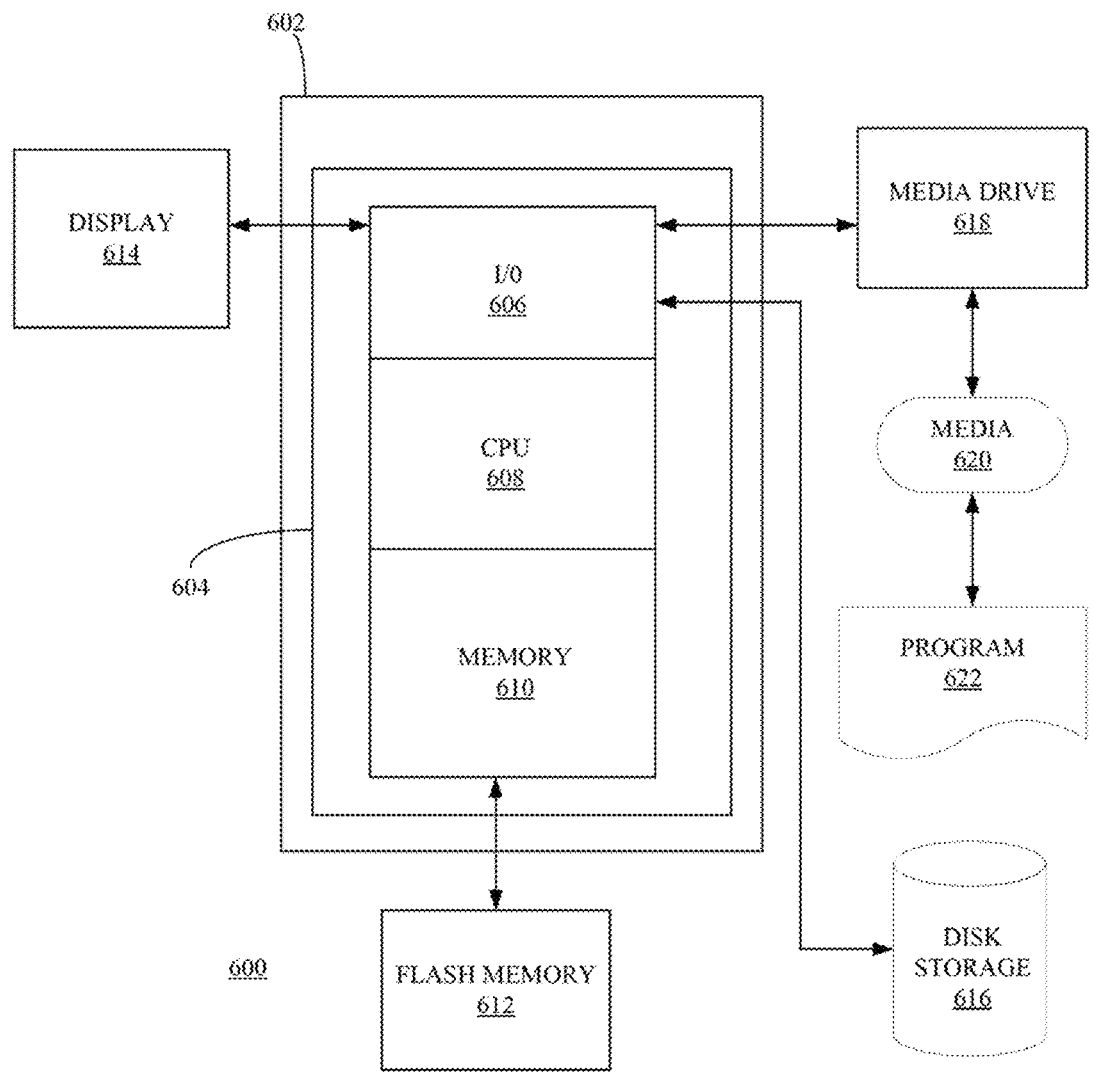
FIG. 6 depicts an exemplary computing system that can be configured to perform any one of the processes provided herein.

FIG. 6 depicts an exemplary computing system 600 that can be configured to perform any one of the processes provided herein. In this context, computing system 600 can include, for example, a processor, memory, storage, and I/O devices (e.g., monitor, keyboard, disk drive, Internet connection, etc.). However, computing system 600 can include circuitry or other specialized hardware for carrying out some or all aspects of the processes. In some operational settings, computing system 600 can be configured as a system that includes one or more units, each of which is configured to carry out some aspects of the processes either in software, hardware, or some combination thereof.

FIG. 6 depicts computing system 600 with a number of components that can be used to perform any of the processes described herein. The main system 602 includes a motherboard 604 having an I/O section 606, one or more central processing units (CPU) 608, and a memory section 610, which can have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities.

Exemplary Use Cases and Additional Exemplary Processes

Figure 7A:
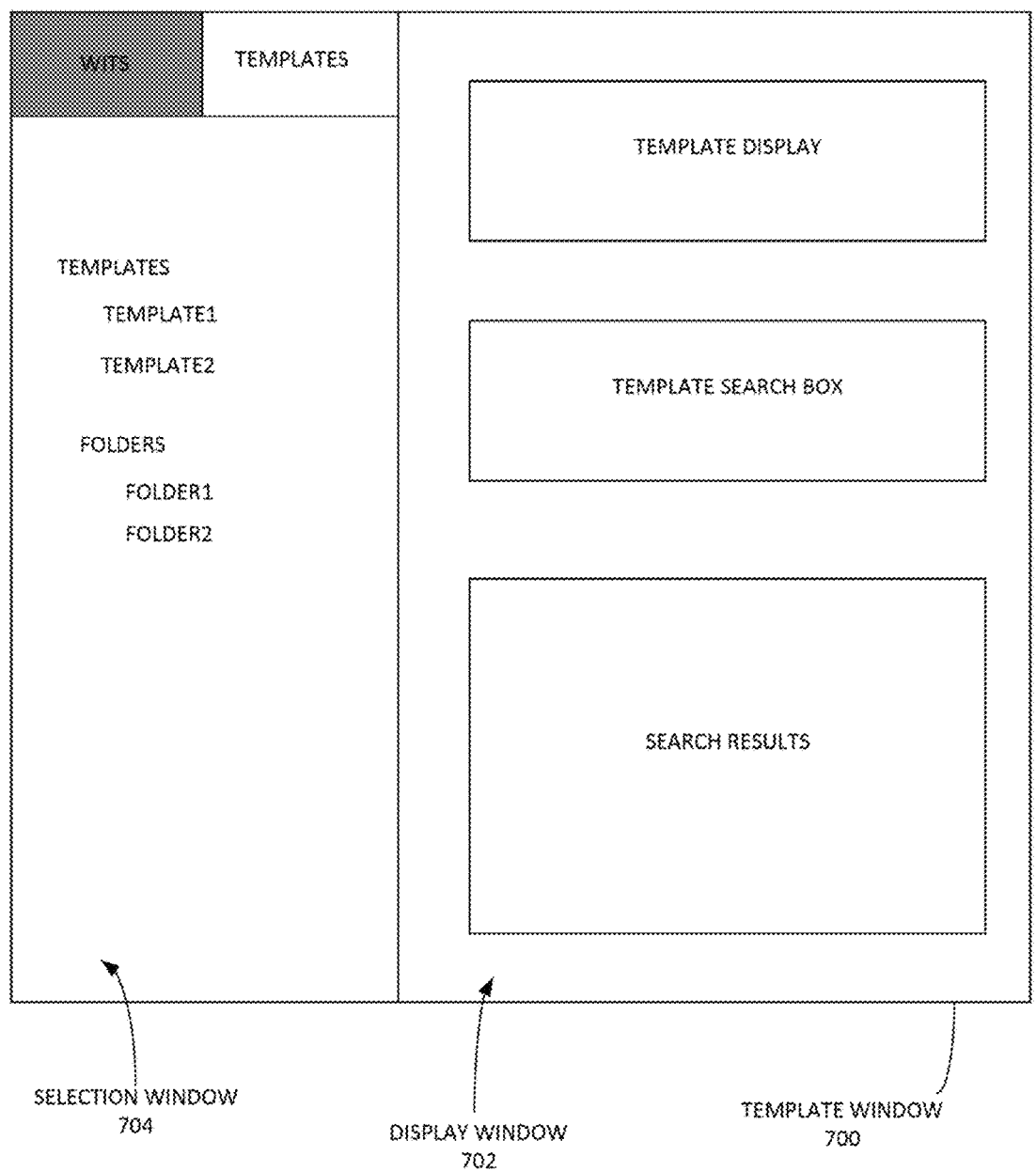
FIGS. 7A and 7B depict block diagrams that illustrates a process of searching and using wits in templates, according to several embodiments.
Figure 7B:
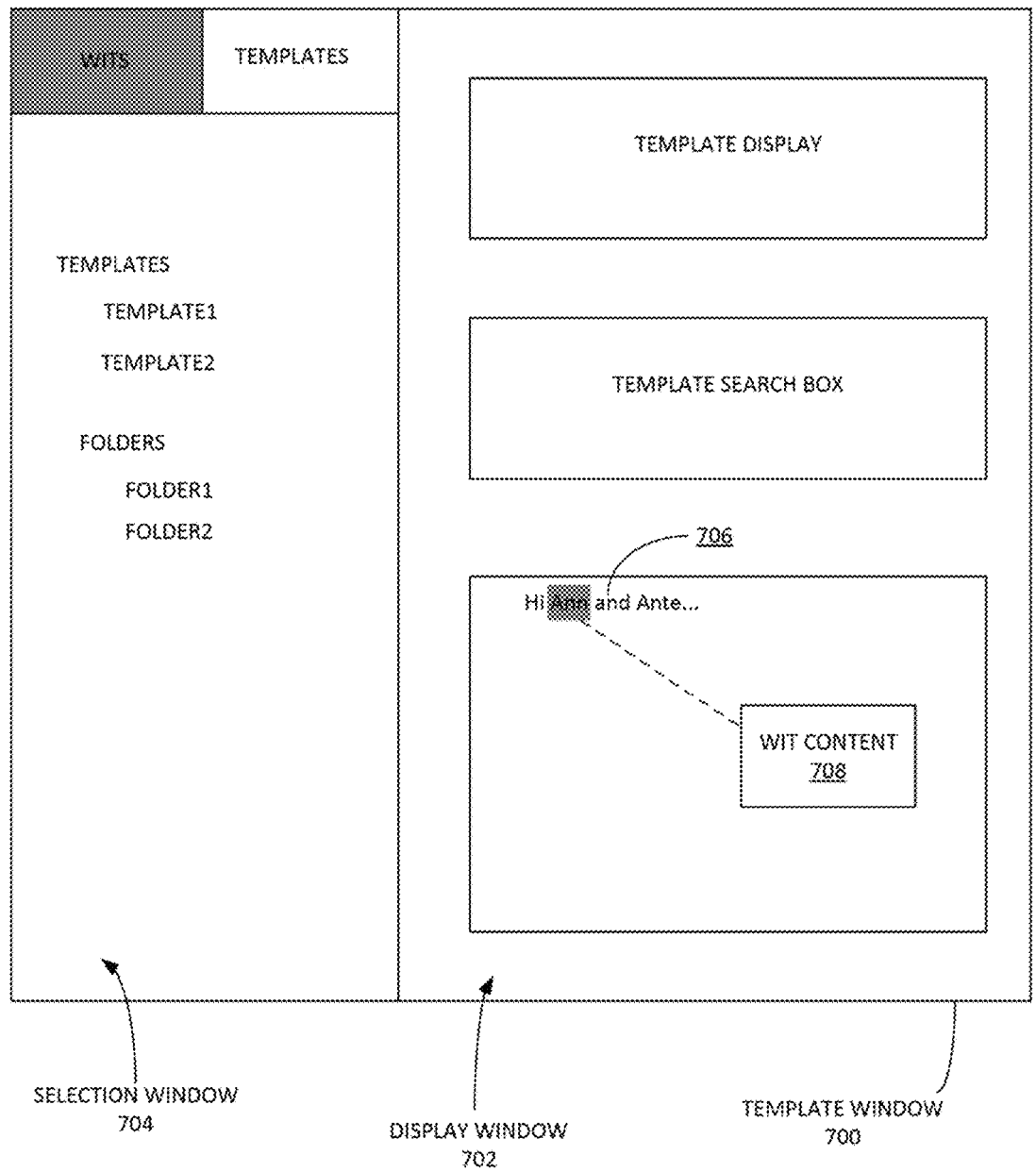

FIGS. 7A and 7B depict block diagrams that illustrates a process of searching and using wits in templates, according to several embodiments. The template can refer to any specific format for arranging information such as in a write-up. For example, in an organization, specific e-mail formats can be used for various e-mailing purposes such as leave letters, reimbursement forms and so on. In this example, an e-mail can be created in the desired format and this e-mail can be used as a template for writing e-mail of that specific type. In another embodiment, the templates can also refer to pre-stored texts such as words and/or sentences that can be used in mails and messages in desired locations. The templates can be classified and stored under certain groups and/or folders, as shown in selection window 704. Further, when a folder is selected, templates stored in that particular folder can be displayed to the user in the display window 702. The user can be able to search for specific templates using the template search box. In order to search for any specific templates or group of templates, the user can have to enter a specific address/index associated with the required templates in the search box. The user can also be able to enter multiple addresses/indexes to broaden or refine search query. In an embodiment, wit(s) 708 can be used in creating text in the templates. For example, consider that the user has to create a template for reimbursement form. The user can have to insert own signature. If the user has saved his/her signature information as a wit, he/she can use this wit while creating the template.

Figure 8:
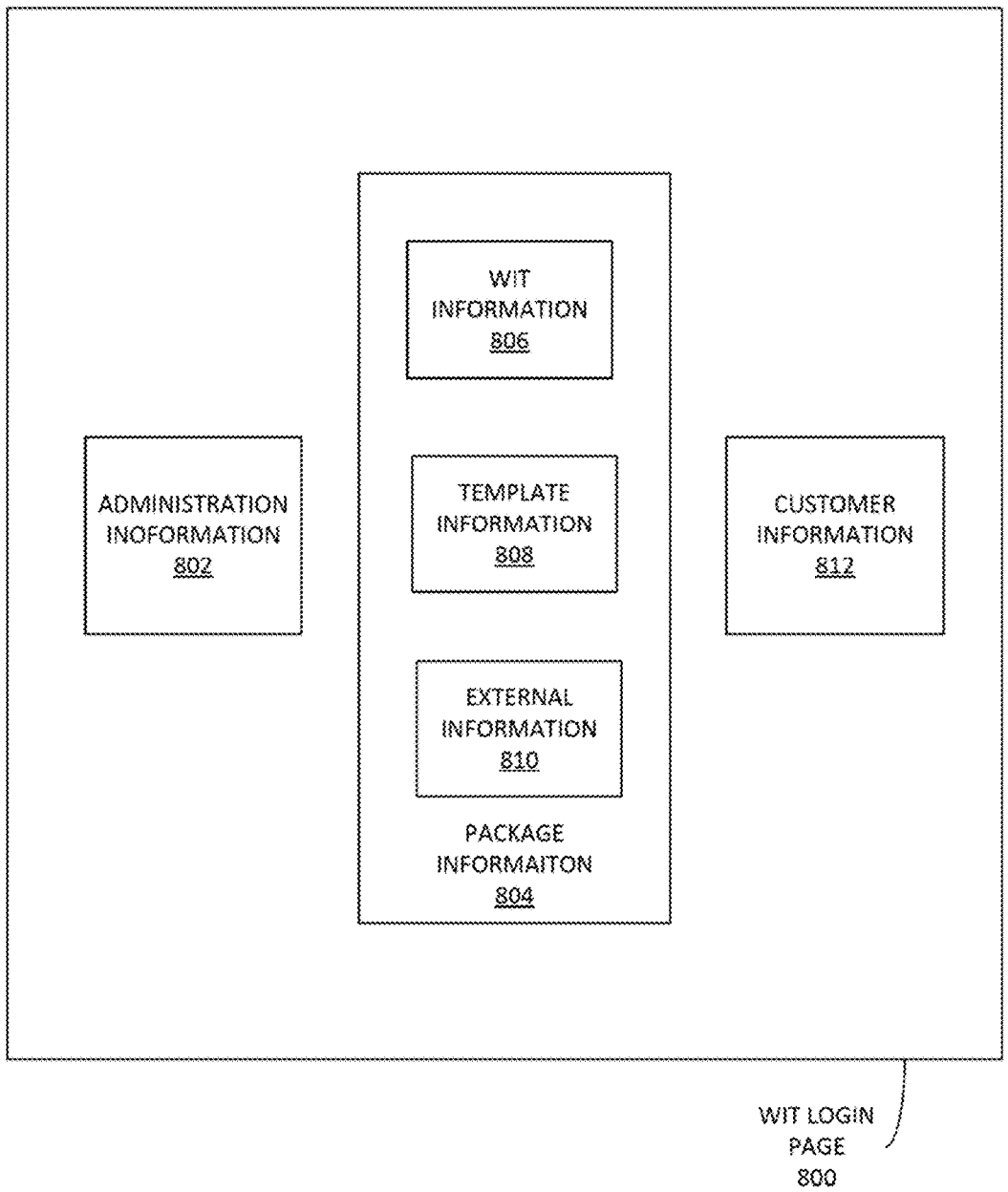
FIG. 8 illustrates a block diagram that illustrates a wit application landing page, according to some embodiments.

FIG. 8 is a block diagram of an example with application landing page 800, according to some embodiments. The landing page 800 can include various windows that include information such as administration information, package information, customer information and so on. The administration information window 802 can include information regarding a user logged into the WIT system. The user can be an administrator or any other authorized person. The administration information can include information such as user name, login information, contact information, designation and/or any other information relevant to the user.

Further, the package information window 804 can include information such as wit information, template information, external information and the like. Wit information 806 can include data related to each wit such as wit size, number of times a particular wit has been used, wit identifier(s), advanced wit analytics and/or other information related to each wit. Template information 808 can include information such as template identifier, lists in which the template present, format of the template, encryption status, advanced template analytics status and/or other information related to each template. External information 810 can include information on link status with various external applications such as YouTube®), Dropbox®, (and/or any other web-based file hosting service) and the like.

Further, the customer information window (CIW) 812 can include information regarding the customers registered to the wit application service. Customer information 812 can include information such as company name, display name, account number, first name, last name, address and/or other information related to each user/customer. An administration can have permission to modify any the stored information or format.

Figure 9:
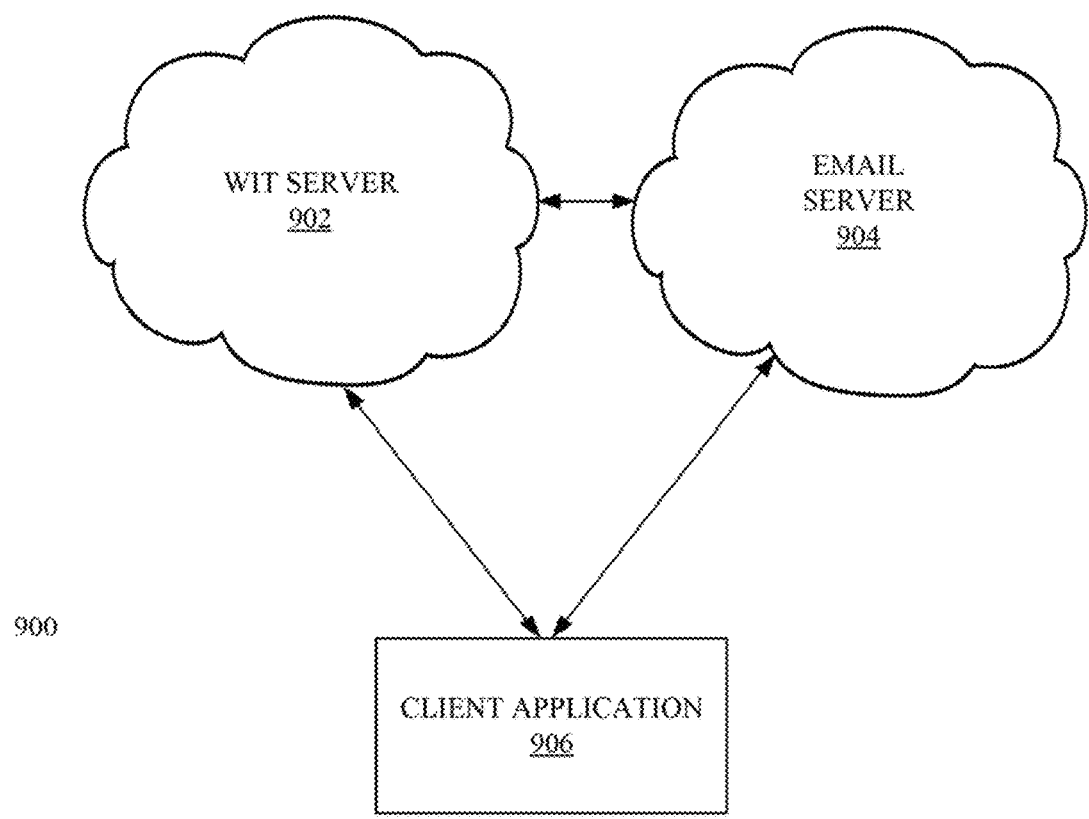
FIG. 9 illustrates an example implementation of drag and drop mechanism between wits application and an email client, according to some embodiments.

FIG. 9 illustrates an example implementation of drag and drop mechanism between wits application and an email client, as disclosed in the embodiments herein. A drag and drop operation can include a visual mechanism to transfer data across applications as well as within application without using plug-ins, add-ons, etc. This can be similar to clipboard function of cut or copy and paste mechanism. A proprietary program and algorithms can be provided to achieve such data transfer among the applications. When an application implements drop action handlers (e.g. accepts drop events) then data can be provided by generating a drag action from any application. The target application can have the following attributes: accepts drop events; understands copy, link and/or move actions of drop events; supports various Multipurpose Internet Mail Extensions (MIME) types (e.g. URL files, image files, audio files, video files, PDF files, etc.).

For example, the system can include wit server 902, mail server 904 and a client application 406 in a user device, connected to each other to facilitate data transfer each other. Assume that the user has registered to the wit application mechanism (e.g. to the wit server 902). A user can store information to be repeatedly used, in the form of wits in wit server 902. The wit client application 406 can be installed in the user device either as a native application or in the form of plugin in any associated application (or in any such suitable form).

When a user composes an email, the user may want to insert an address that is already stored in the wit server 902 in the form of a wit (e.g. a content block). The user can search for that particular wit in the wit server 902 by performing an address/index search in a search field (e.g. see supra). In one embodiment, the search can provide multiple results. Further, the user can select a suitable wit from the retrieved list. In order to use the selected wit in a particular mail, the user can perform a drag and drop operation dragging the wit from the wit application to the email. In another example, the user can use a combination of address and a hotkey to access and use information stored in a particular wit.

Additionally, while dragging and dropping a wit from the wit application/widget to the email client, it can be determined that the selected wit information can be copied directly from the wit server 902 to the email server 904. In this case, the user can save time and bandwidth as he/she does not have to upload the wit to email server 904. In another embodiment, if the server to server update fails due to any technical issues, the client application 406 can to download the required wit(s) and communicate the wits to the local email client. In this case, the wit information downloaded from wit server 902 is uploaded to the mail server 904 from the client application 406 (e.g. via a local email client).

Figure 10:
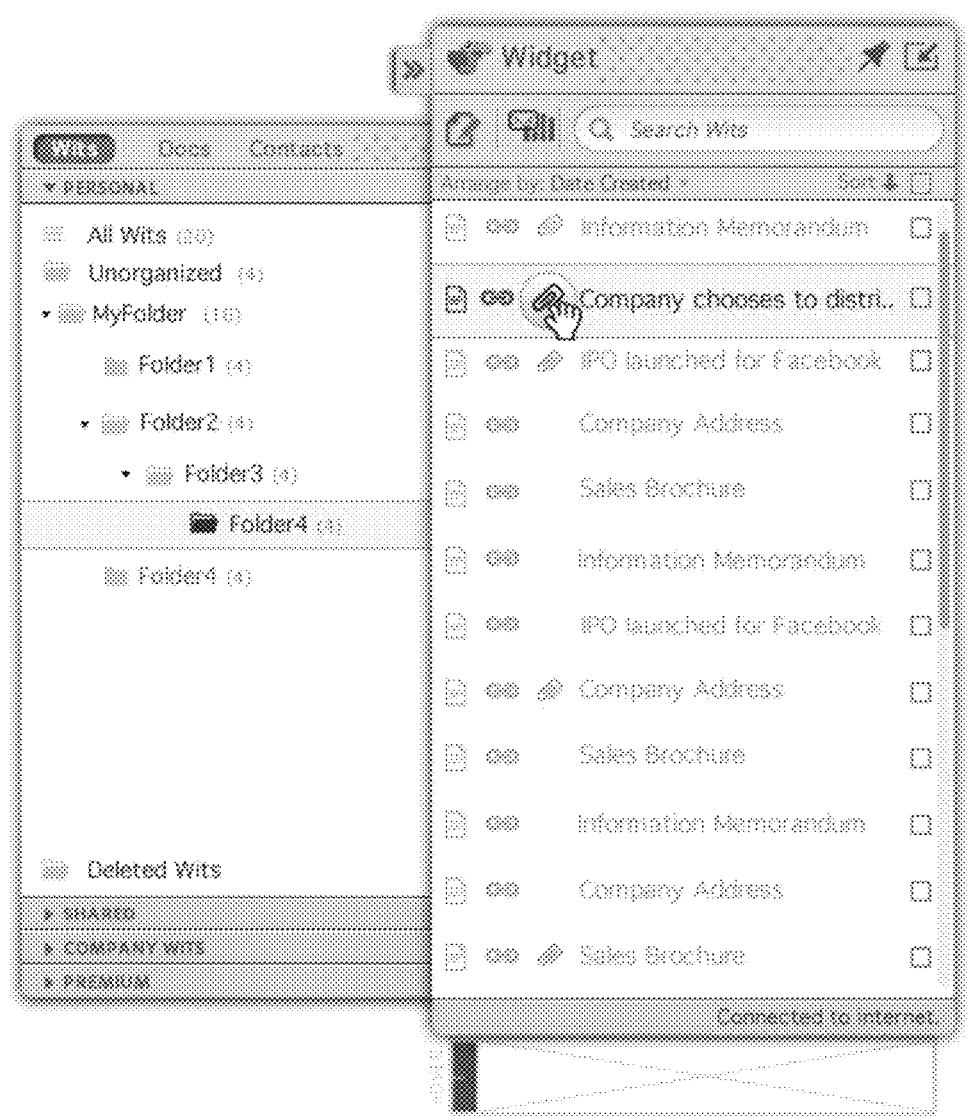
FIG. 10 illustrates a sidebar widget displaying a list of wits (e.g. reusable content blocks) that the user can access, according to some embodiments.

FIG. 10 illustrates a sidebar widget displaying a list of wits (e.g. reusable content blocks) that the user can access, according to some embodiments. The user can pose a natural language question in the search field. The artificial intelligence algorithms can interpret the question using natural language processing (NLP) functionalities and semantically understand the question or context of the question. The artificial intelligence algorithms can feed the interpretation to recommendation functionalities to fetch the matched wits from one or more content repositories. Recommendation programs can generate metadata and tags. Recommendation programs can organize the content across one or more repositories in an indexed fashion for quick matching and faster retrieval leveraging data mining and other techniques. This aspect the artificial intelligence programs can be based on a machine learning language functionality that continuously refines the matching answer to a given question.

Figure 11:
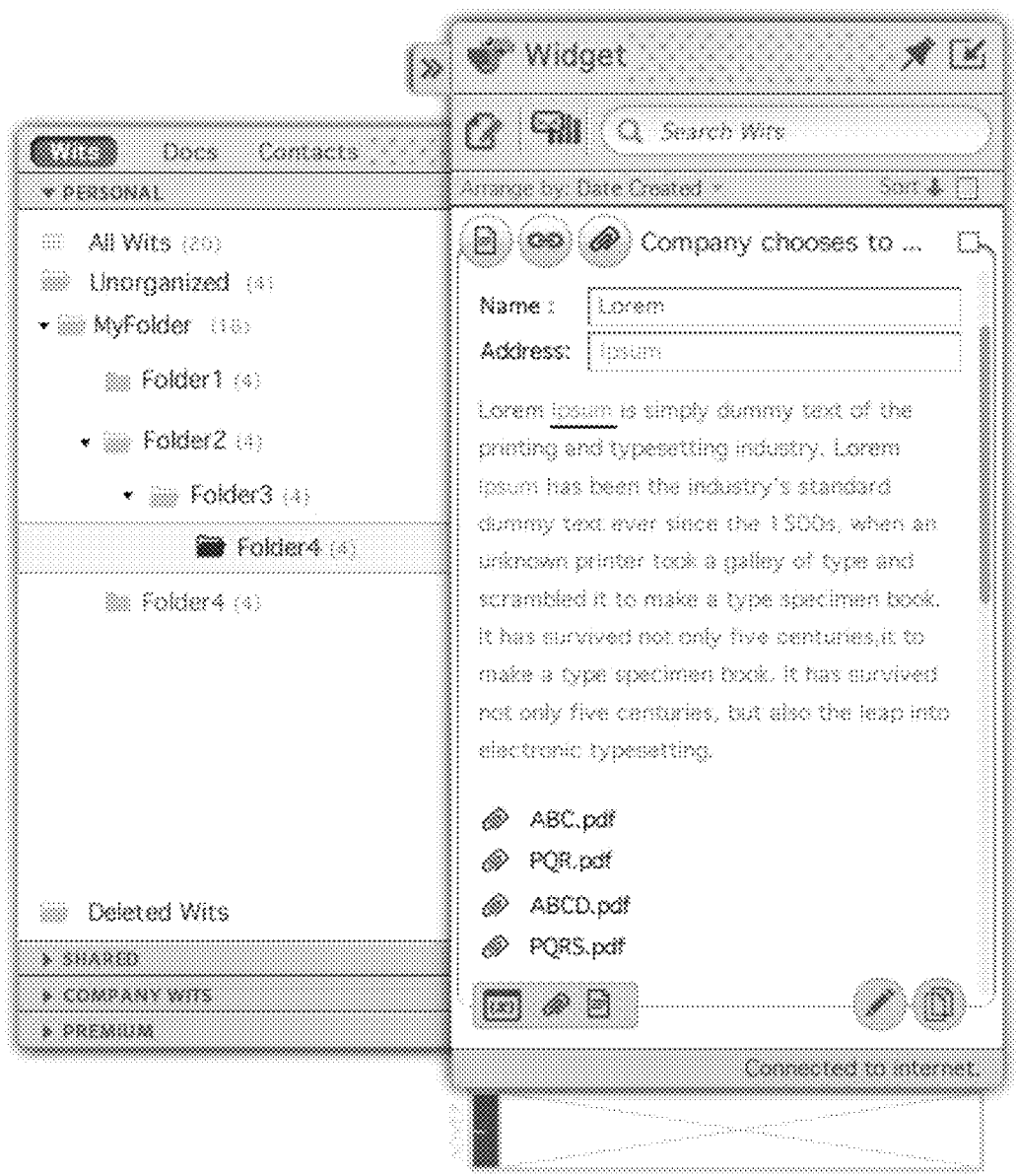
FIG. 11 illustrates the composition of a wit, as well as, the user of a wit with an external application, according to some embodiments.

FIG. 11 illustrates the composition of a wit, as well as, the user of a wit with an external application, according to some embodiments. A wit can include a dynamic variable keyword (e.g. substitution strings) that can be manually keyed-in by the user at the time of use, these manually keyed-in values are correspondingly substituted in place of dynamic variable keyword in the entire content block. A wit can include textual element of the content block which includes rich text, media such as video, image, audio objects, links to external content, tables, charts, screen captures, forms, etc.; and 3) one or more documents as attachments, these documents can be fetched from internal storage or from one or more external repositories as configured by the content creator.

Figure 12:
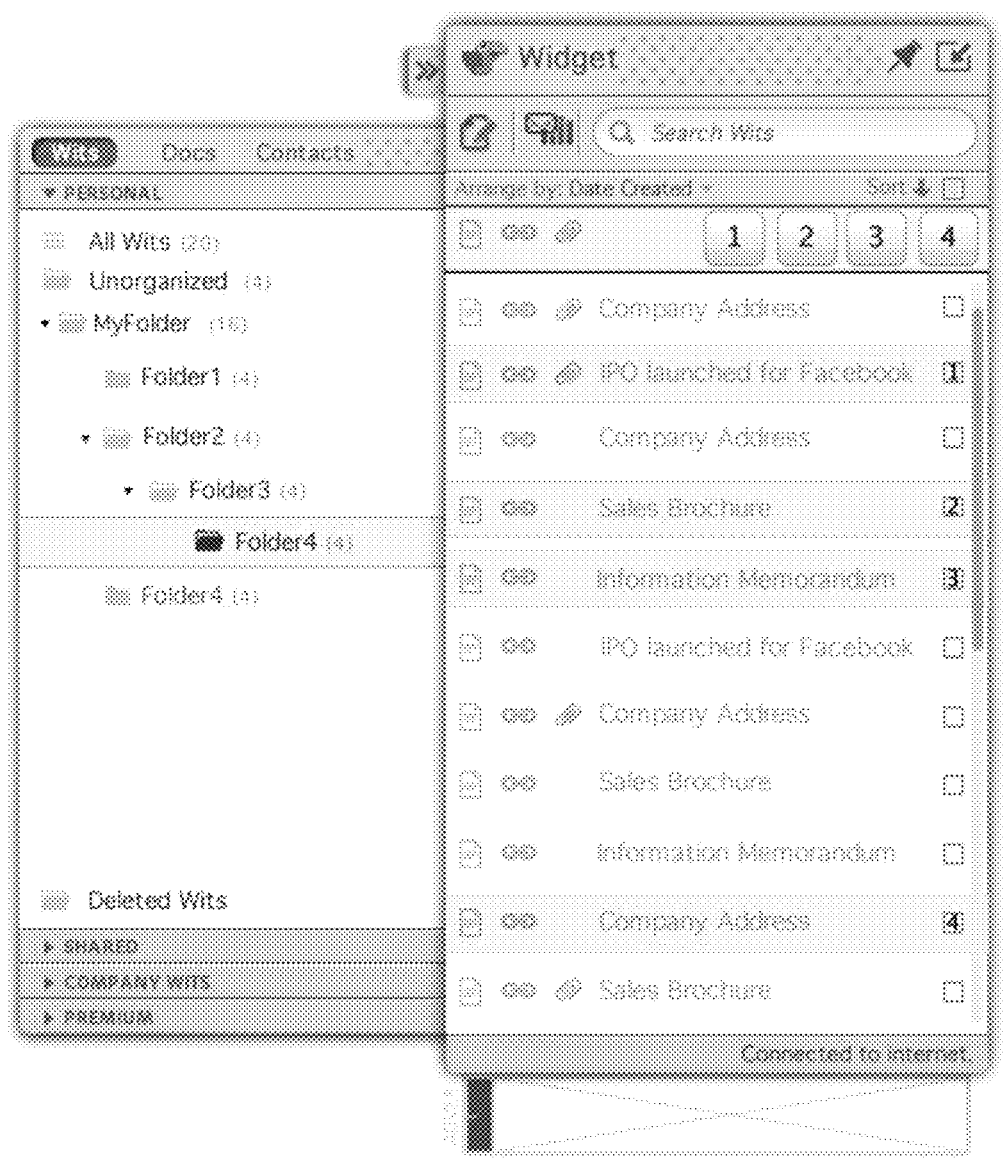
FIG. 12 illustrates a 'compound Wit'. A compound wit can be a shell or a container, housing one or more individual wits, according to some embodiments.

FIG. 12 illustrates a 'compound Wit'. A compound wit can be a shell or a container, housing one or more individual wits, according to some embodiments. A user can select one or more individual wits and create a compound wit dynamically in a client (e.g. a desktop computer client) and/or widget with a unique identification. At the time of using a compound wit t, the wit functionality can automatically gather content of the respective individual wits in substantially real time from one or more content repositories to ensure the currency of information. Compound wit can be aggregates of dynamic variable keywords, textual content and document attachments from the respective individual wits housed inside of a compound wit.

Figure 13:
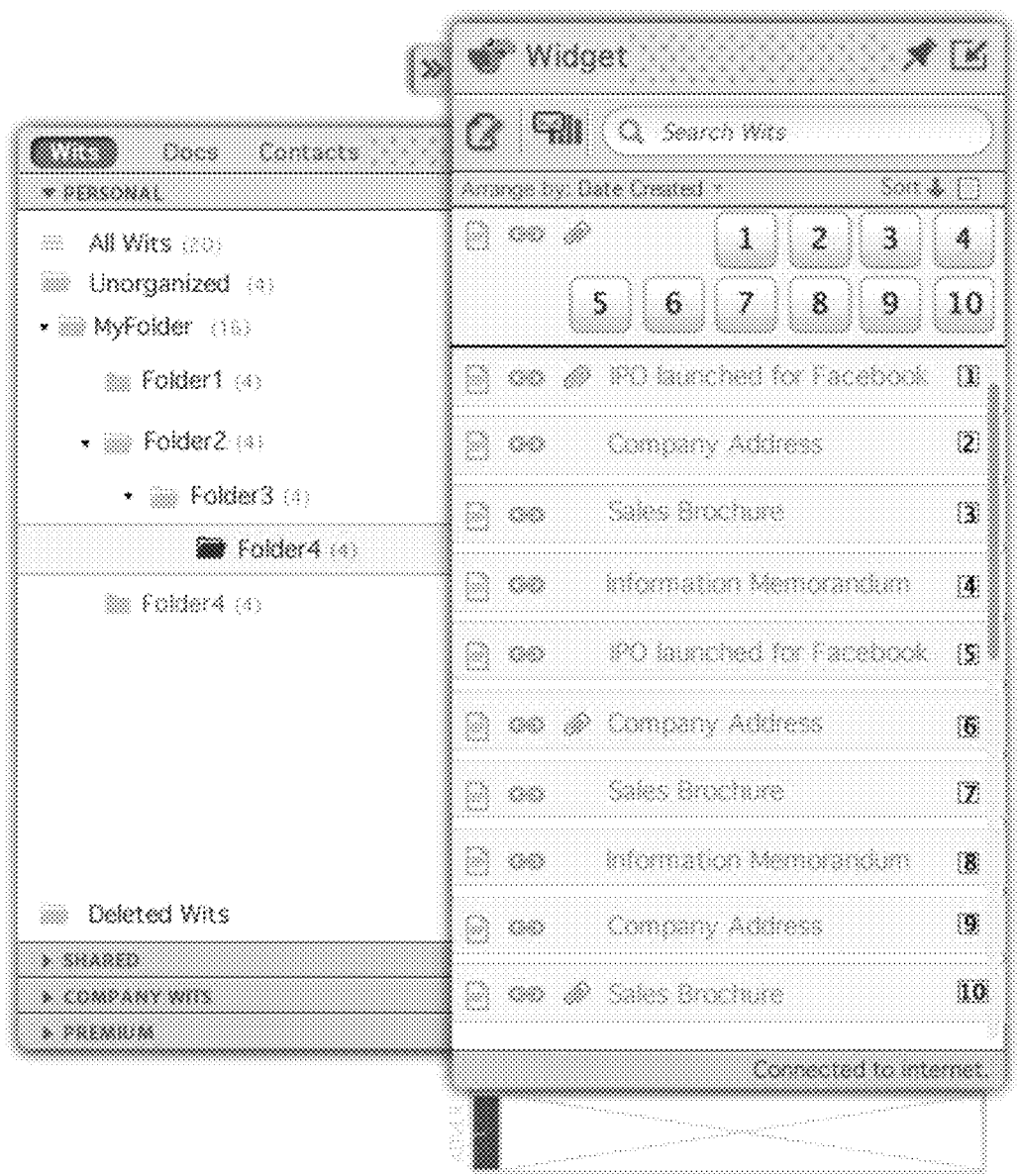
FIG. 13 illustrates the organization and sequencing of wits inside a compound wit, according to some embodiments.

FIG. 13 illustrates the organization and sequencing of wits inside a compound wit, according to some embodiments. A user can select one or more wits to be part of a compound wit and these selected wits can be displayed in the order in which they are selected. The users can have the ability to move around the wits inside of a compound wit by moving the numbered rounder square blocks. The sequence of transferring the content from widget to other programs can be as set by the user inside of the compound wit.

Figure 14:
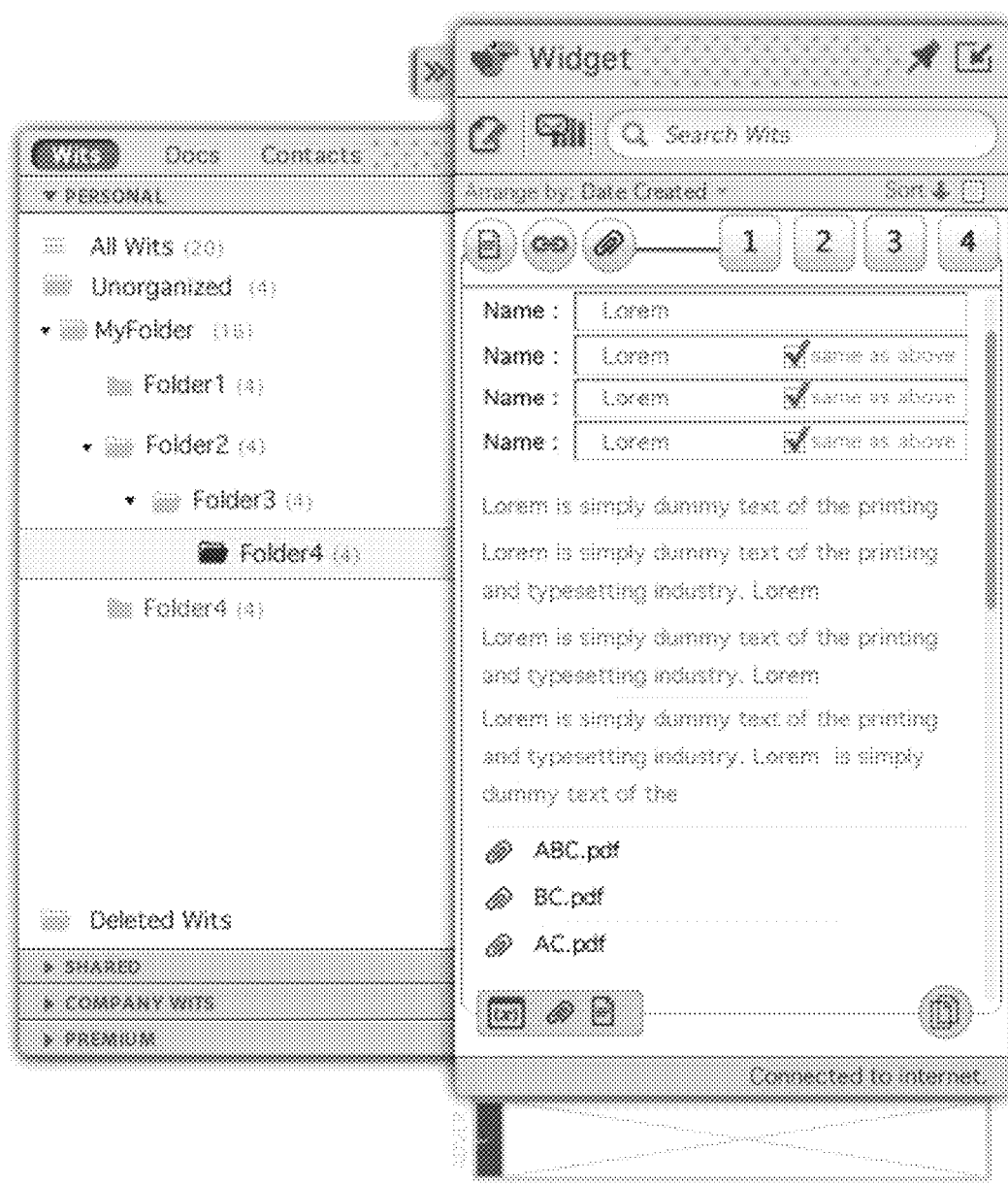
FIG. 14 illustrates population of dynamic variable keyword values automatically by a wit functionality instead of user manually keying-in process, according to some embodiments.

FIG. 14 illustrates population of dynamic variable keyword values automatically by a wit functionality instead of user manually keying-in process, according to some embodiments. A user can provide a unique key to the program such as customer number and automatically fetch the data points about a customer and populate the dynamic variable keywords with the customer data points. These customer data points can be federated from one or more content repositories.

Figure 15:
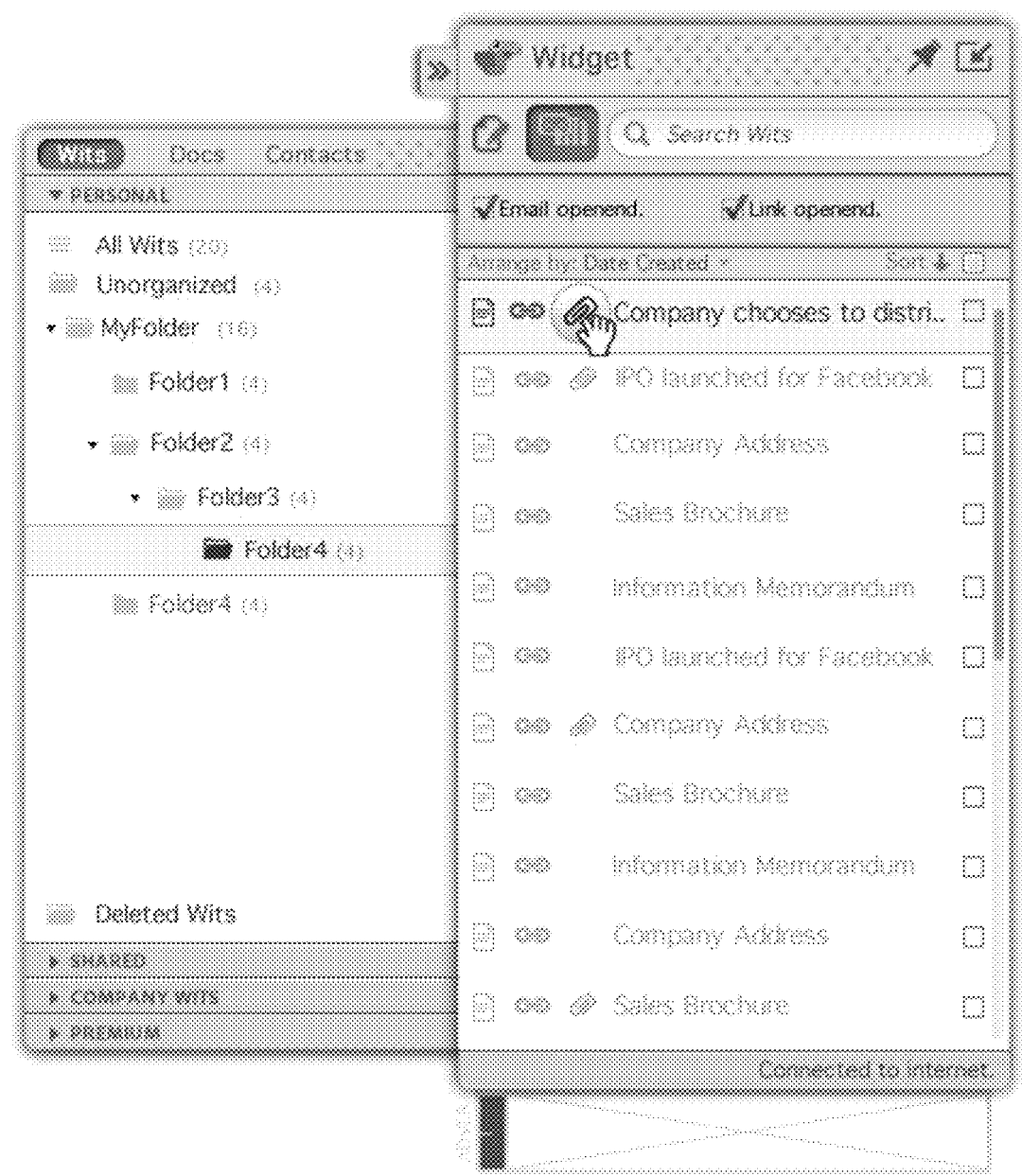
FIG. 15 illustrates a wit-related drag and drop operation. A user can transfer the wit content to other programs in multiple ways, according to some embodiments.

FIG. 15 illustrates a wit-related drag and drop operation. A user can transfer the wit content to other programs in multiple ways, according to some embodiments. For example, textual content can be transferred by dragging and dropping the document icon. By doing so, the rich text content including the substituted keyword values are transferred to target programs such as email client, word or PowerPoint® or a browser (and/or other applications or programs). In another example, a link to a wit can be generated by dragging and dropping the link icon in the middle to the receiving application such as email client and/or any other applications. Clicking on this link can take the user to a protected or unprotected customized browser page in which the entire wit content can be consumed. Attachments in the wit can be generated by dragging and dropping the attachment clip icon. When user drag and drops the clip icon to other applications/programs (e.g. a GUI icon display of said application/program), the set of documents inside the wit can collated substantially in real time from one or more content repositories and transferred to the target program.

CONCLUSION

The embodiments disclosed herein can be implemented through at least one software program running on at least one hardware device and performing network management functions to control the network elements. The network elements shown in FIGS. 4, 5 and 9 include blocks which can be at least one of a hardware device, or a combination of hardware device and software module. Furthermore, the processes/methods described herein can be implemented with one or more computer processors.

The embodiments disclosed herein specify systems and methods for content management. The mechanism allows assembling emails using reusable contents in a repository, and providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented through or together with a software program written in e.g. Very High speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device can also include means which can be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein can be implemented in pure hardware or partly in hardware and partly in software. The device can also include only software means. Alternatively, the invention can be implemented on different hardware devices, e.g. using a plurality of CPUs.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can he embodied in a machine-readable medium and/or a machine accessible medium compatible with a data processing system (e.g., a computer system), and can be performed in any order (e.g., including using means for achieving the various operations). Accordingly, the specification and drawings are to he regarded in an illustrative rather than a restrictive sense. In some embodiments, the machine-readable medium can be a non-transitory form of machine-readable medium.

What is claimed is:

1. A computer-implemented method of cloud-computing based content management comprising:
   receiving a dynamic content block generated by a first user of a first client application in a first user's computing device, wherein the dynamic content block comprises a text element and a dynamic text element, wherein the dynamic text comprises a reference to one or more federated content sources, wherein the dynamic content block comprises a reusable portion of a user-generated information, wherein the dynamic content block comprises a reusable portion of a user-generated information that comprises a dynamic rich textual element and an attachment, and wherein dynamic content block comprises a repeatedly used email content and a portion of a digital sales document;
   storing the dynamic content block in a cloud-storage environment;
   receiving a search query for the dynamic content block by a second client application in a second clients computing device;
   fetching a portion of the dynamic content block from the one or more content sources referred to in the dynamic content block;
   integrating, the portion of the dynamic content block received from the one or more content sources into the dynamic content block; and
   providing the dynamic content block to the second client application.

2. The method of claim 1, further comprising:
   receiving an update to the dynamic content block by the first user; and automatically synchronizing, with at least one processor, the update to the dynamic content block to the second client application.

3. The method of claim 1, wherein the rich textual element comprises a rich media element.

4. The method of claim 1 further comprising,
detecting a drag and drop operation from the second client application to another application, wherein the other application is a client application of a third-party server process, and wherein third-party server process is communicatively linked with the cloud-storage environment.

5. The method of claim 4 further comprising:
communicating the dynamic content block from the cloud-storage environment to the third-party server process.

6. The method of claim 5, wherein the third-party server process comprises an email server process.

7. The method of claim 1, wherein the first client application comprises a first a graphical user interface (GUI) widget that displays the dynamic content block to the first user.

8. The method of claim 7, wherein the GUI widget includes to search functionality for searching the cloud-storage environment.

9. The method of claim 1, wherein the dynamic text element is specified by a text symbol proximate to the dynamic text element.

10. A computer system for cloud-computing based content management, the system comprising:
physical memory configured to store a dynamic content block, wherein the dynamic content block comprises a reusable portion of a user-generated information, wherein the, dynamic content block comprises a reusable portion of a user-generated information that comprises a dynamic rich textual element and an attachment, and wherein dynamic content block comprises a repeatedly used email content; and
one or more physical processors configured to:
receive the dynamic content block generated by a first user of a first client application in a first user's computing device;
store the dynamic content block in a cloud-storage environment;
receive a search query for the dynamic content block by a second client application in a second client's computing device;
fetch a portion of the dynamic content block from the one or more content sources referred to in the dynamic content block;
integrate the portion of the dynamic content block received from the one or more content sources into the dynamic content block; and
provide the dynamic content block to the second client application.

11. The computer system of claim 10, wherein the one or more processors are further configured to:
receive an update to the dynamic content block by the first user; and
automatically synchronize the update to the dynamic content block to the second client application.

12. The computer system of claim 11, wherein the dynamic content block
comprises a repeatedly used email content.

13. The computer system of claim 11 wherein the one or more processors is further configured to detect a drag and drop operation from the second client application to another application, wherein the other application is a client application of a third-party server process, and wherein third-party server process is communicatively linked with the cloud-storage environment.

14. The computer system of claim 12 wherein the one or more processors is
further configured to communicate the dynamic content block from the cloud-storage environment to the third-party server process.

15. A method comprising:
receiving a request for a reusable content block from a client-side computing device, wherein the reusable content block comprises a textual content and an associated document, wherein the reusable content block comprises a reusable portion of a user-generated information that comprises a dynamic rich textual element and an attachment, and wherein reusable content block comprises a repeatedly used email content and a portent of a digital sales document;
fetching one or more portions of the reusable content block from one or more data repositories;
federating the one or more portions of the reusable content block; and
providing a federated version of the reusable content block to the client-side computing device or a third-party server.

* * * * *